United States Patent
Desserrey et al.

(10) Patent No.: US 11,583,779 B2
(45) Date of Patent: Feb. 21, 2023

(54) MESSAGE INTERFACE EXPANSION SYSTEM

(71) Applicant: Snap Inc., Santa Monica, CA (US)

(72) Inventors: Laurent Desserrey, Los Angeles, CA (US); Dylan Shane Eirinberg, Venice, CA (US); Matthew Colin Grantham, Toronto (CA); David Whyte, Toronto (CA); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/946,597

(22) Filed: Jun. 29, 2020

(65) Prior Publication Data

US 2021/0387097 A1 Dec. 16, 2021

Related U.S. Application Data

(60) Provisional application No. 63/037,433, filed on Jun. 10, 2020.

(51) Int. Cl.
| | | |
|---|---|---|
| *A63F 13/87* | (2014.01) | |
| *A63F 13/77* | (2014.01) | |
| *A63F 13/30* | (2014.01) | |

(52) U.S. Cl.
CPC .............. *A63F 13/77* (2014.09); *A63F 13/30* (2014.09); *A63F 13/87* (2014.09)

(58) Field of Classification Search
None
See application file for complete search history.

(56) References Cited

U.S. PATENT DOCUMENTS

| | | | |
|---|---|---|---|
| 2009/0075738 A1* | 3/2009 | Pearce | A63F 13/79 463/42 |
| 2011/0307354 A1* | 12/2011 | Erman | G06Q 30/0282 705/27.1 |
| 2016/0279523 A1* | 9/2016 | Altagar | A63F 13/2145 |
| 2017/0050114 A1 | 2/2017 | Luo et al. | |
| 2017/0173476 A1 | 6/2017 | Schindler et al. | |
| 2018/0025021 A1* | 1/2018 | Jain | H04L 67/1095 707/626 |
| 2018/0188906 A1 | 7/2018 | Carter | |
| 2018/0296928 A1 | 10/2018 | Vaccari et al. | |
| 2018/0309801 A1* | 10/2018 | Rathod | H04L 67/141 |
| 2020/0051376 A1* | 2/2020 | Lutnick | G07F 17/32 |
| 2020/0101388 A1 | 4/2020 | Vaccari et al. | |

FOREIGN PATENT DOCUMENTS

WO    WO-2021252232 A1    12/2021

OTHER PUBLICATIONS

"International Application Serial No. PCT/US2021/035368, International Search Report dated Sep. 17, 2021", 3 pgs.
"International Application Serial No. PCT/US2021/035368, Written Opinion dated Sep. 17, 2021", 3 pgs.

* cited by examiner

*Primary Examiner* — Damon J Pierce
(74) *Attorney, Agent, or Firm* — Schwegman Lundberg & Woessner, P.A.

(57) ABSTRACT

Systems and methods directed to detecting user selection of an application icon, retrieving a first and second category of applications in response to detecting the user selection of the application icon, and generating an application interface associated with a chat interface, that concurrently displays the first and second category of applications, as well as a selection mechanism that includes a game selector, commercial selector, and a collective selector.

20 Claims, 14 Drawing Sheets

MESSAGE INTERFACE EXPANSION SYSTEM

CLAIM OF PRIORITY

This application claims the benefit of priority to U.S. Patent Application Ser. No. 63/037,433, filed on Jun. 10, 2020, which is incorporated herein by reference in its entirety.

BACKGROUND

As the popularity of mobile-based social networking systems continues to grow, users increasingly share and access programs, games, or media content items, such as photos or videos with each other. In many cases, the applications, games, and media content items are typically uniquely personalized, and thus, reflect a demand to encourage electronic visual communication on a global scale.

Social networking systems comprise millions of users. Each user in a social networking system can receive and transmit applications and media content items between members within her individual social networking profile or to individuals outside of the social networking profile.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

As the rise in downloadable media applications for social media networking systems continues to increase, it becomes increasingly difficult to present the most prevalent and targeted media applications in an interactive platform. In the present disclosure, users are able to interact with other users in a collaborative environment, such as in a chat messaging interface. During this interaction, an abundant amount of gaming, music, entertainment applications, and other all-purpose media applications are available for download and integration into the chat interface.

However, it is difficult to categorize and highlight the media applications of choice for one or more users engaged in the chat interface. In industry today, media applications programmed and configured for smartphone devices are more complexed in technical structure and are embedded with sophisticated two-dimensional and three-dimensional graphics and collaborative gaming enablement. Due to the digital complexities, current social media networking systems are unable to present and integrate these applications in a robust and efficient chat messaging interface.

In at least one example, a system is provided that generates a media application interface that is expanded and extended from a chat messaging interface in a social media application. The system can access eligible media applications with advanced level digital composition and then categorize, distinguish, and highlight the applications in the media application interface using a selection mechanism as desired by the user.

The media applications include applications focused on gaming (solo and collaborative), entertainment, business, social, and music. During the categorization of the media applications, the system can rank and sort the desired media applications according to the user's preference, gaming application characteristics, commercial application characteristics, and user profile settings. The system also considers other logic and criteria when ranking and categorizing the media applications, such as, the type of gaming applications downloaded and how many contacts the user has stored in their user profile.

Networked Computing Environment

Figure 1:
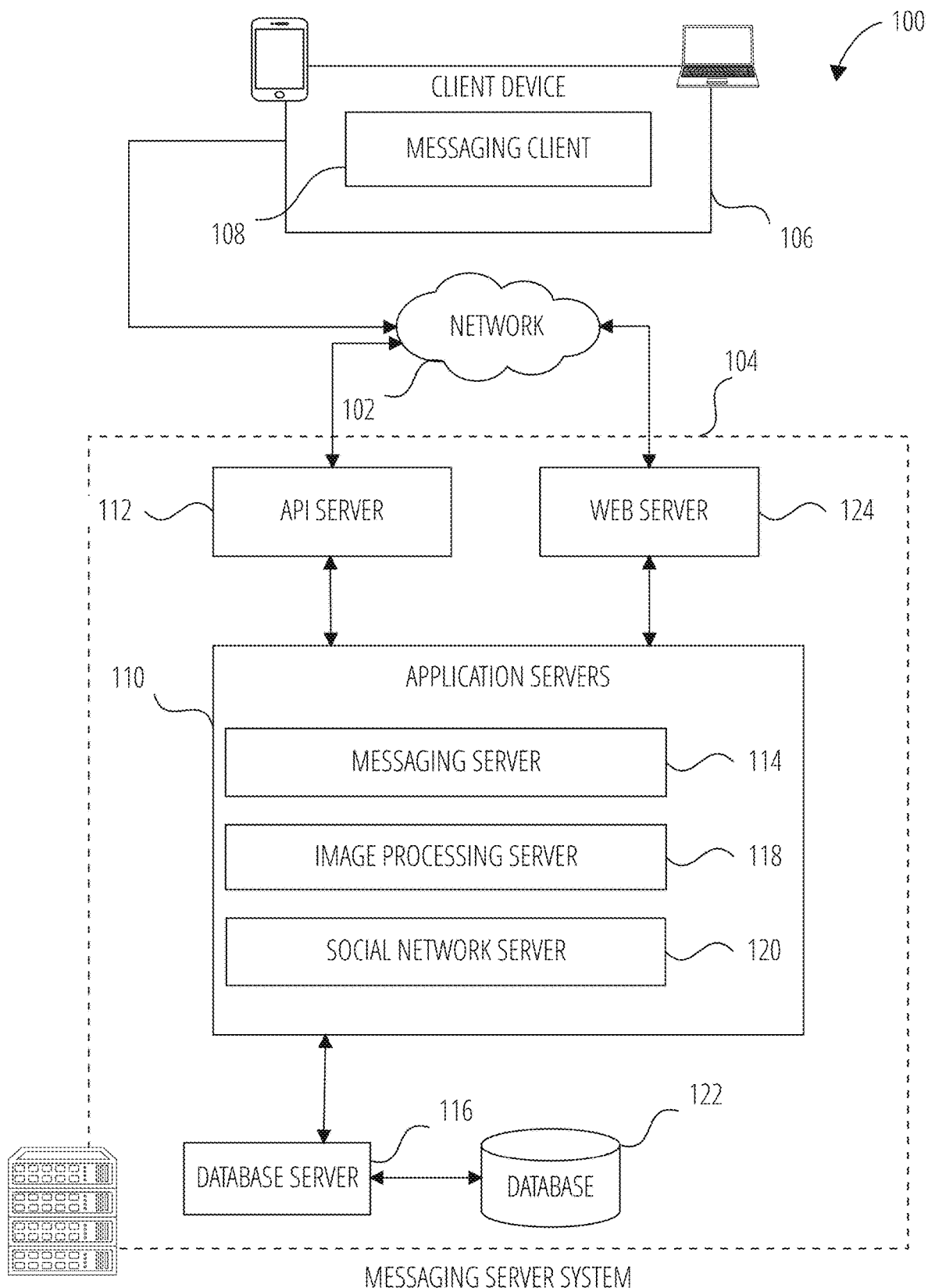
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data, exchanges within the messaging system 100 are invoked and controlled through functions available via user interfaces (Us) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
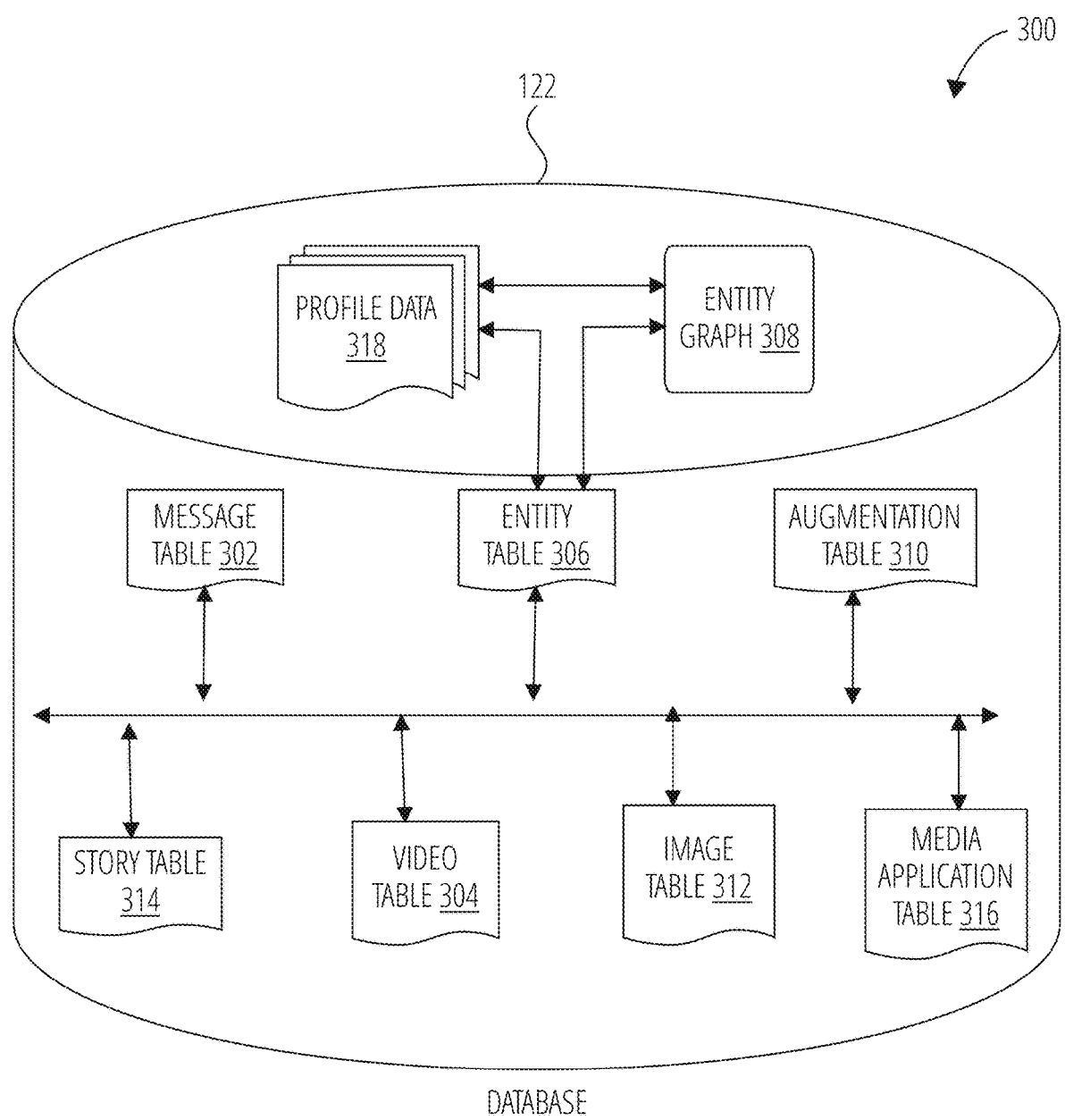
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
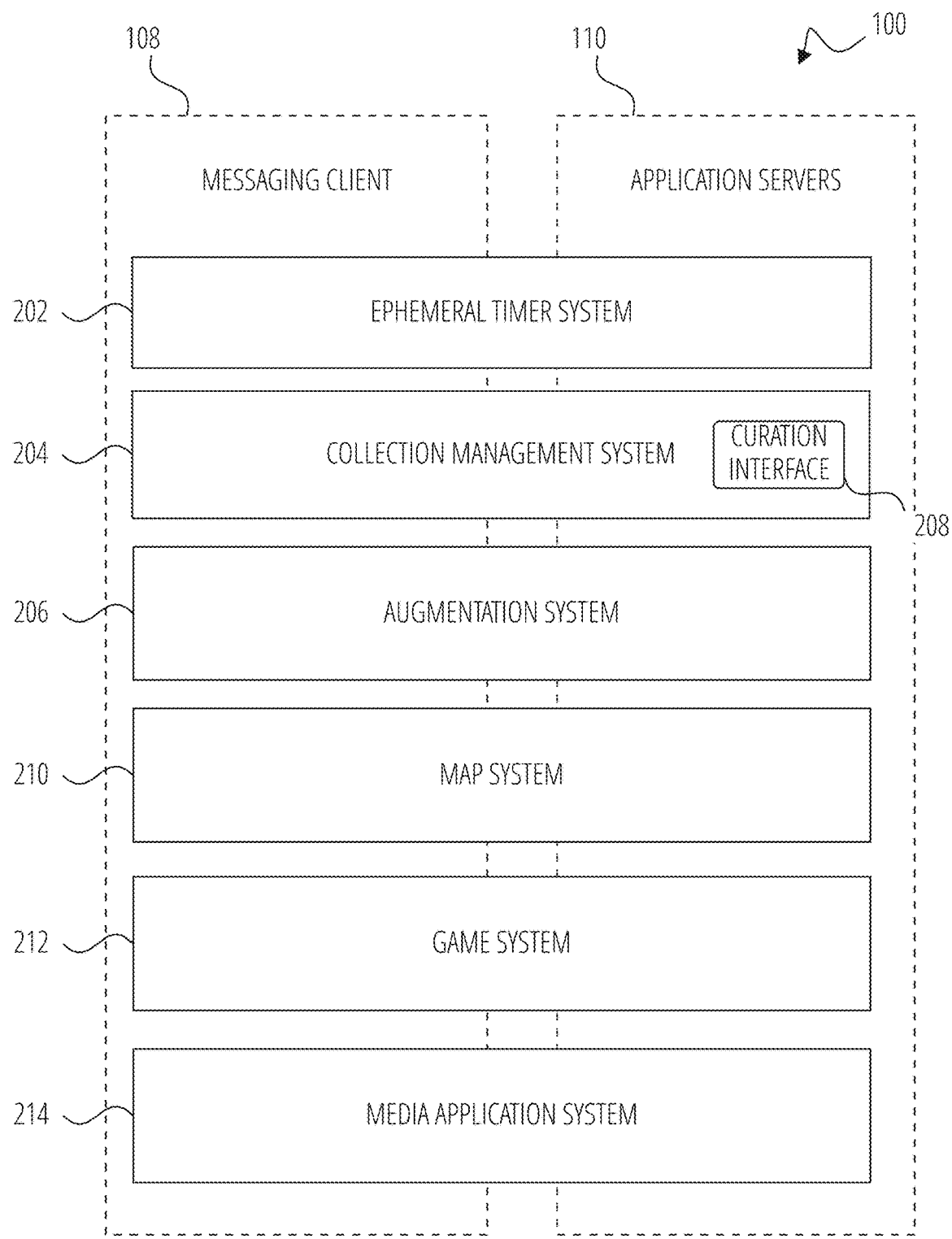
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, a map system 208, a game system 210 and a media application system 212.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 214 that allows a collection manager to manage and curate a particular collection of content. For example, the curation interface 214 enables an event organizer to curate a collection of content relating to a specific event (e.g., delete inappropriate content or redundant messages) Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The media application system 212 executes functions, routines, and operations including accessing a media application icon augmented in the chat interface of the messaging client 104, accessing media applications from a gaming server, second computing device, web server, or application servers 112. In some examples, the media applications are gaming applications, collaborative gaming, non-collaborative gaming applications, commercial applications associated with customized business, entertainment, social, file sharing, productivity, health, commerce, or music. Each of the media applications can also include at least one gaming characteristic or at least one commercial characteristic detailing the information type, title, the amount of user contacts needed to be incorporated into the application, the developer name, and the amount of memory needed to download the application.

The media application system 212 further executes operations including generating a media application interface that associated and expanded from the chat interface, receiving the media applications from the gaming server, second computing device, web server 124, or application servers 112, and causing the media application interface to display the media applications and the media application tab. The selection mechanism includes various icons, including a game selector, commercial selector, and collective selector that, when activated via user gesture, enables the user of the computing device to categorize, highlight, distinguish, rank, or sort the displayed media applications.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations), A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in some examples, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database 120 can also store media applications in the media application table 318 received from application servers 112, computing devices, a web server 124, or a third-party media application server. The media applications, in some examples, include applications configured for and related to customized gaming, business, social, sporting, music, health, commercial, file sharing, productivity, entertainment, movies, education, automotive, fantasy, puzzles, or the like. Each of the media applications has associated characteristics that are also stored in media application table 318.

In some examples, the characteristics include gaming characteristics and configuration requirements, as well as, commercial characteristics and configuration requirements. The gaming characteristics, in some examples, include the type of game, the title of the game, the amount of contacts that can be incorporated or invited into the game, the number of game downloads, a popularity score of the game, a description of the game, the developer name, and the amount of memory needed to download the game at a messaging client 104, messaging server 114, or client device 102.

In another example, the commercial characteristics corresponds to information related to applications directed to customized business, health, commercial, file sharing, productivity, social, sporting, music, entertainment, movies, education, automotive, or fantasy. The commercial characteristics can also include the number of commercial application downloads or uploads, a popularity score of the commercial application, the title of the application, developer name, a description of the application, content of the application, or the amount of user contacts needed to collaborate in the media application.

Data Communications Architecture

Figure 4:
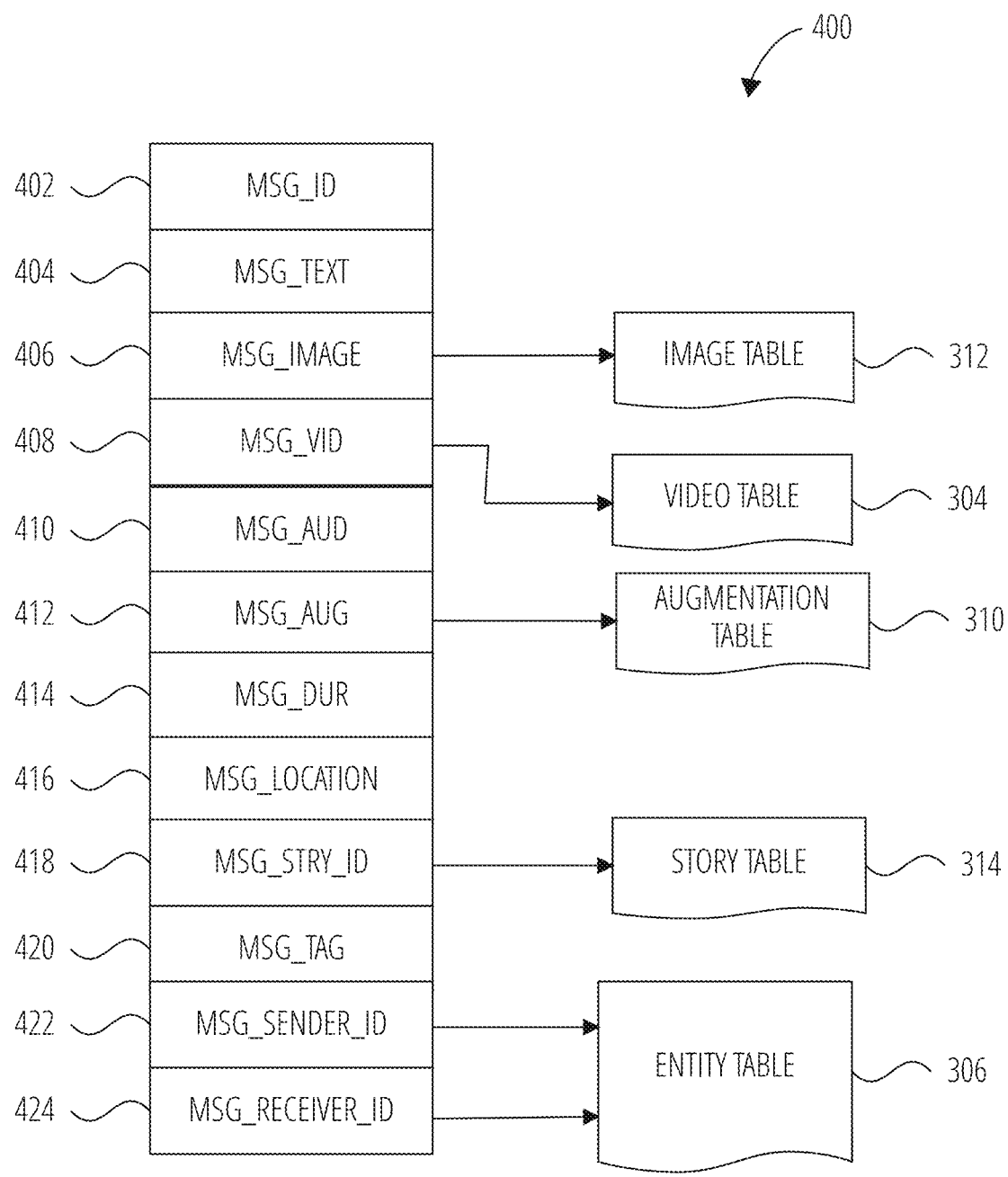
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
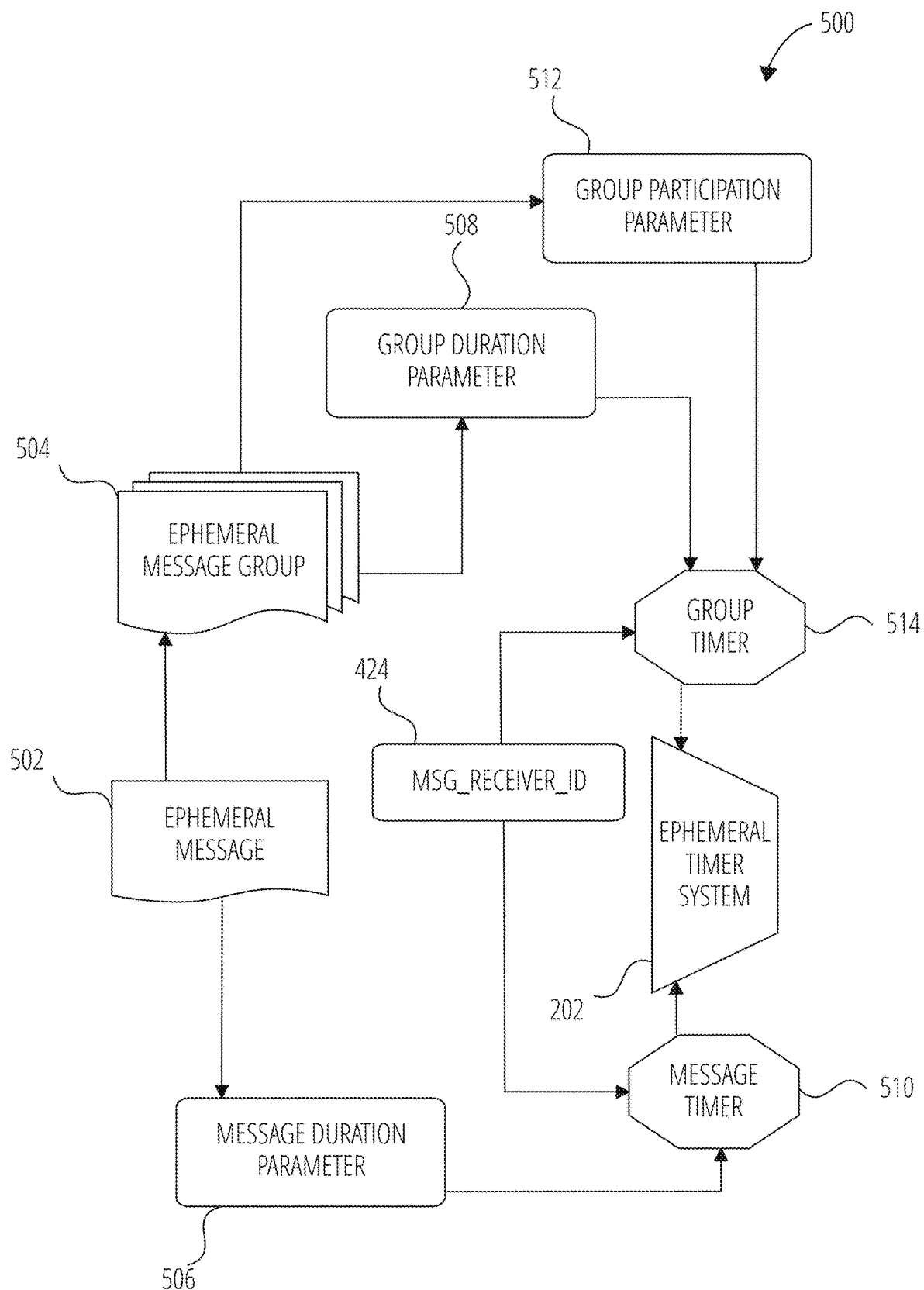
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In some examples, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In some examples, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
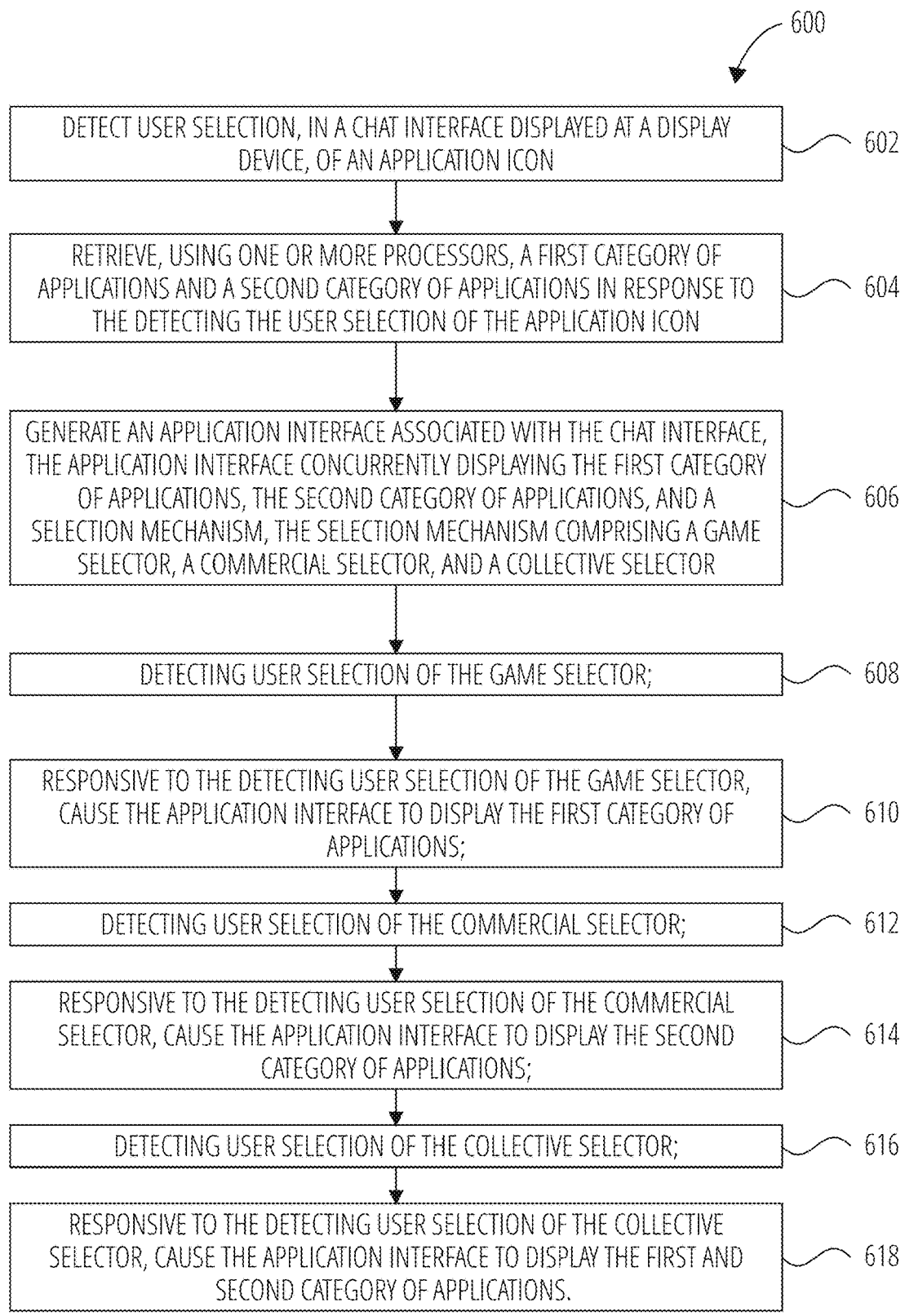
FIG. 6 is a flowchart illustrating a method 600 for generating an application interface associated with a chat interface in accordance with some examples.

FIG. 6 is a flowchart illustrating a method 600 for generating a media application interface (e.g., application interface) associated with a chat interface in accordance with some examples. While certain operations of the method 600 are described as being performed by certain devices, in different examples, different devices or a combination of devices may perform these operations. For example, operations described below as being performed by the client device 102 may also be performed by or in combination with server-side computing device (e.g., the messaging server system 108), or third-party server computing device.

The method 600 commences with operation 602, during which the client device 102, and more specifically, an application executing on the client device 102 (e.g., the messaging client 104) detects user selection, in a chat interface displayed at a display device, of a media application icon. In some examples, user selection corresponds to a user of the client device 102 applying a user gesture to the media application icon when displayed in the chat interface. The user gesture can be a finger swipe, head movement, finger press, voice command, or the like.

The media application icon is an image, three-dimensional object, two-dimensional object, image overlay component, augmented transformation, or graphical object. In other examples, the media application icon is an animation that performs stop-motion movements such as jumping, bouncing, gliding, or any other type of animated deformation before or after a user applies the user gesture on the media application icon in order to activate the media application.

In operation 604, the client device 102 retrieves a first category of media applications and a second category of media applications in response to detecting the user selection of the media application icon. In some examples, the first and second category of media applications are media applications that are stored at the client device 102, server-side computing device (e.g., the messaging server system 108), or third-party server computing device. While the current example describes the first and second category media applications as being received from the messaging service system 108, some or all of the media applications may be reserved from third-party servers (not shown). Additionally, a payment system (not shown) may be communicated with by the client device 102, and the messaging service system 108 and or any third party service, prior to delivery of the media applications, so as to any authorized delivery of these media applications subsequently to a payment transaction with a user of the client device 102. This payment transaction, some examples, may be facilitated by the messaging client 104 or a third-party a messaging application also posted on the client device 102.

In other examples, the first category of media applications may be collaborative and non-collaborative gaming applications that are customized for the user of the client device 102. (e.g., messaging client 104) based on information stored in the profile data 308 of a user profile associated with the client device 102. The second category of media applications may be collaborative or non-collaborative commercial applications that are designed, configured, and directed to customized business, health, commerce, social, entertainment, sports, government, political, music, banking, education, electronics, or similar commercial activity applications.

In operation 606, the messaging client 104 generates a media application interface associated with the chat interface in which the media application interface concurrently displays the first category of media applications, the second category of media applications, as well as a selection mechanism. The selection mechanism includes a game selector, a commercial selector, and also a collective selector. In some examples, the media application interface displays the first and second category of media applications in a title-by-tile format, list format, tab format, for any polygonal design (see FIG. 7 and FIG. 8). In other examples, the media application interface is an extended interface that is expanded from a top, side, or bottom portion of the chat interface below a chat descriptive text field and array of icons, including the media application icon.

The selection mechanism includes command indicia, such as icons or buttons, that are labeled according to user preference. In some examples, the command indicia correspond to a game selector, a commercial selector, and a collective selector. For instance, as illustrated and described in FIGS. 7-9 below, the game selector is labeled as "Games," the commercial selector is labeled as "MINIS" and the collective selector is labeled as "ALL." In other examples, the game selector is associated with each of the retrieved first category of media applications, the commercial selector is associated with each of the retrieved second category of media applications, and the collective selector is associated with both the first and second category of media applications.

In operation 608, the messaging client 104 detects the user selection of the game selector, and in operation 610, the messaging client 104 causes the media application interface to display the first category of media applications. For instance, if a user of the messaging client 104 presses the game selector, all gaming applications associated with the game selector are displayed in the media application interface. During operation 612, the messaging client 104 detects the user selection of the commercial selector, and in response, at operation 614, the messaging client 104 causes the media application interface to display the second category of media applications. For instance, upon applying a user gesture on the commercial selector within the selection mechanism, a selection is received at the messaging client 104, which in turn causes the media application interface to display the second category of media applications. Still referring to FIG. 6, at operation 616, the messaging client 104 detects user selection of the collective selector, and in response to detecting user selection of the collective selector, the messaging client 104 executes operations operation 618, which includes causing the media application to display the first and second media applications.

In some examples, the first category of media applications corresponds to gaming applications that can be collaborative or non-collaborative. The second category of media applications includes commercial applications associated with custom gaming, business, productivity, file sharing, social, entertainment, music, health, or education. In other examples, the first category of media applications can also include a game description, a game graphic element, a gaming characteristic, and a game launching indicia. The second category of media applications also includes commercial descriptions, commercial characteristics, commercial graphic elements, and commercial launching indicia.

Figure 7:
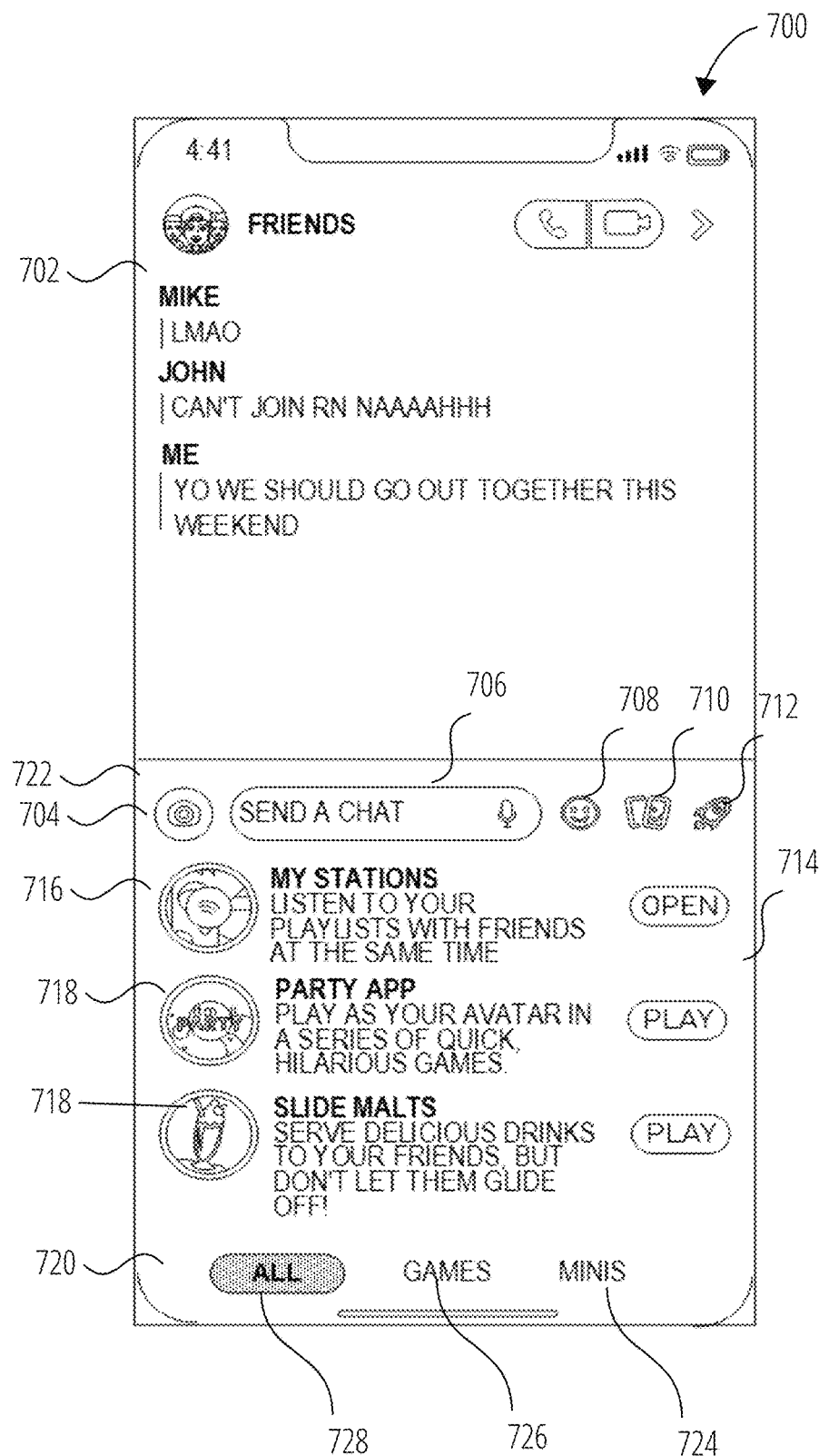
FIG. 7 is an interface diagram illustrating a user interface of the application interface expanded from the chat interface displaying media and gaming applications, in accordance with some examples.

FIG. 7 is an interface diagram illustrating a user interface of the media application interface expanded from the chat interface displaying media and gaming applications, in accordance with some examples. The user interface 700, also referred to as a chat interface 700 includes a chat interface display section 702. The chat interface 702 displays users in the messaging application 1346 currently or recently engaged in a chat session.

As shown in FIG. 7, the users include "Mike, John, and Me". As the users interact and engage in the chat session shown in chat interface 702, a media application interface 714 is also shown. The chat interface toolbar 722 includes a camera icon 704, chat text field 706, digital expression icon 708, content collection icon 710, and a media application icon 712. In some examples, the camera icon 704 activates the computing device (e.g., client device 102) integrated camera in order to capture photographs or videos. A user can input an alpha-numeric string of characters into the chat text field 706 in order to communicate and interact in the chat session.

The digital expression icon 708 enables a digital expression interface (not shown) to display in order for the user of the computing to select a digital expression icon, such as an avatar, image overlay, 3D expression object, or some type of augmentation data stored in image table 316. In another example, the content collection icon 710 accesses and displays a content collection interface (not shown) that includes a variety of data regarding collections of messages and associated image, video, or audio data, which are compiled into a collection (e.g., content collection, a story or a gallery) as stored in the story table 312. In some examples, and as shown in FIG. 7, the media application icon 712 is an indicium in the form of a rocket, that when activated via user gesture, displays a media application interface 714. In another example, the media application icon 712 is an image, three-dimensional object, two-dimensional object, image overlay component, augmented transformation, or graphical object.

Still referring to FIG. 7, upon generating and displaying the media application interface 714, a selection mechanism 720, at least one commercial application 716, and at least one gaming application 718 associated with the user profile designated in profile data 308 are displayed in the media application interface 714. The selection mechanism 720 includes three command indicium, including a game selector (e.g., "GAMES"), commercial selector (e.g., "MINIS"), and collective selector (e.g., "ALL") that when activated via user gesture, categories, highlights, distinguishes, ranks, or sorts each of the commercial applications 716 and gaming applications 718.

As illustrated in FIG. 7, the user has selected the "ALL" indicia (e.g., collective selector 728), thus, both the commercial applications 716 and gaming applications 718 are displayed and arranged in the media application interface 714. In some examples, upon selecting the media application icon 712, the "ALL" indicium is selected by default. The user can also rank and sort the displayed media applications, including the commercial application 716 and gaming application 718 according to the user's preference, gaming application characteristics, commercial application characteristics, and user profile settings.

In another example, the media application interface 714 is an extended interface that is expanded beneath the chat interface toolbar 722. For illustration purposes, the commercial application 716 includes commercial characteristics such as a title, type, and description of the commercial application. The gaming applications 718 are formatted in a list or listing arrangement based on the computing device operating system preference.

As shown in FIG. 7, the title of commercial application 716 is "My Stations," the application type is music, and the description is "Listen to your playlists with friends at the same time." The commercial application 716 also includes a launch application indicium, such as an "open" button, which activates the commercial application 716 from the media application interface 714.

The media application interface 714 also displays one or more gaming applications 718, which as shown in FIG. 7, corresponds to the "Party App" and "Slide Malts" gaming titles. Each gaming application 718 includes gaming characteristics such as a title, type, and description of the gaming application. As shown in FIG. 7, the title of the first gaming application 718 is "Party App", the application type is social-non-collaborative, and the description is "Play as your avatar in a series of quick hilarious games," The title of the second gaming application 718 is "Slide Malts", the application type is entertainment-collaborative, and the description is "serve delicious drinks to your friends, but don't let them glide off." Each gaming application 718 also includes a launch application indicium, such as a "play" button, which activates the gaming application 718 application 716 from the media application interface 714.

Figure 8:
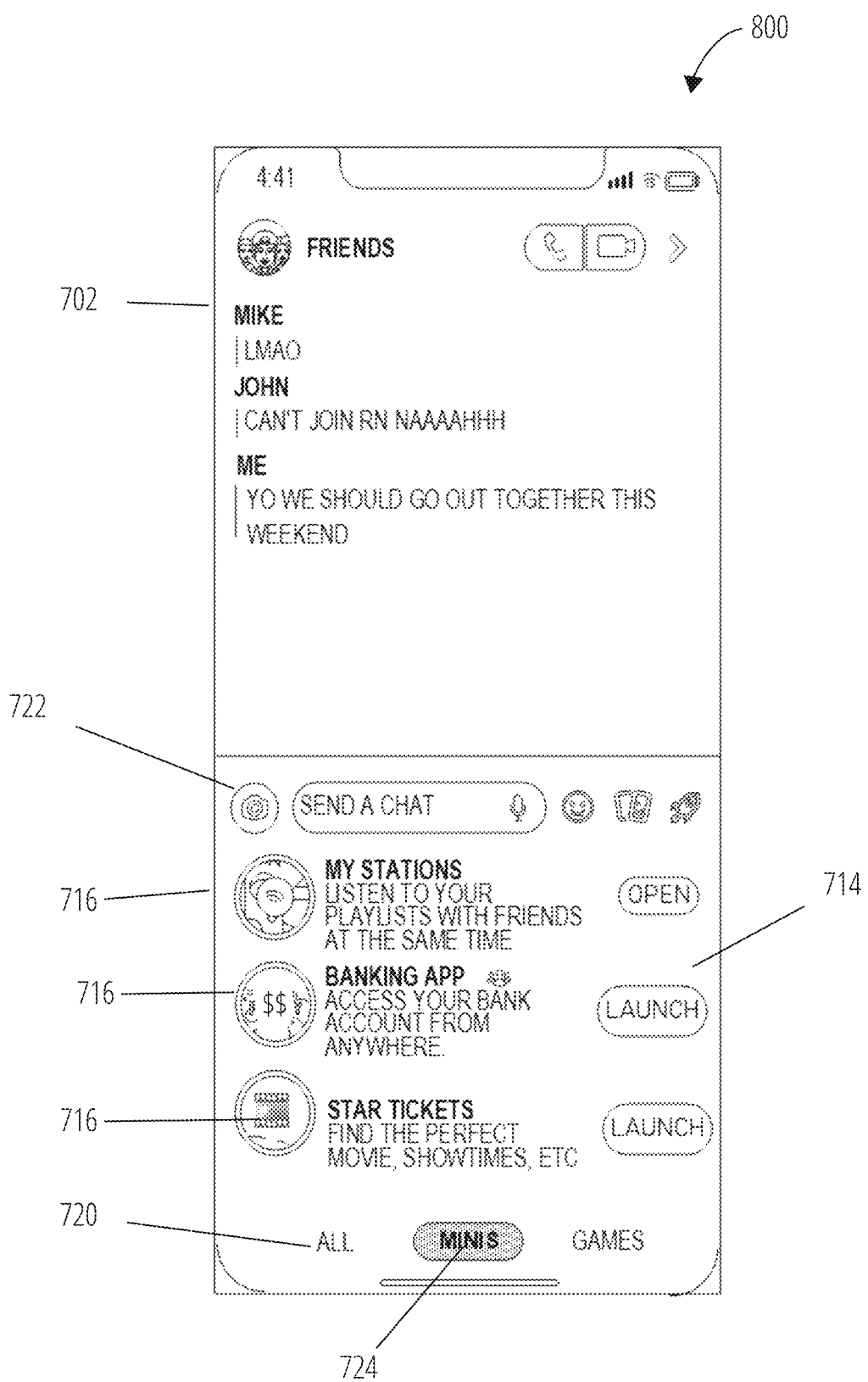
FIG. 8 is an interface diagram illustrating a user interface of the application interface expanded from the chat interface displaying media content applications, in accordance with some examples.

FIG. 8 illustrates an example of a user interface of the media application interface expanded from the chat interface displaying media content applications in accordance with some examples. As illustrated in 8, the media application interface 714 is extended from the chat interface toolbar 722 and chat interface 702. The "MINIS" indicium is associated with the commercial applications 716 that are associated with the user via profile data 308 of the user's computing device (e.g., client device 102) or received from a third-party server, computing device, or memory device.

The user has selected the "MINIS" indicia (e.g., commercial selector 724) from the selection mechanism 720, resulting in each commercial application 716 being displayed and arranged in the media application interface 714. The commercial application 716 includes commercial characteristics such as a title, type, and description of the commercial application. In another example, additional commercial characteristics are also depicted.

As shown in FIG. 8, there are three commercial applications 716, each with a title, description, and application type. For example, one of the commercial applications 716 includes the title "Banking APP," the application type is business-banking, and the description is "ACCESS YOUR BANK ACCOUNT FROM ANYWHERE". The remaining commercial applications 716 include a music commercial application, titled "My Stations" and a movie ticketing commercial application titled "Star Tickets."

The commercial applications 716 also include a launch application indicium, such as an "open" or "launch" button that activates the commercial applications 716 from the media application interface 714. The user can also rank and sort the displayed media applications, including the commercial application 716 according to the user's preference, gaming application characteristics, commercial application characteristics, or user profile settings.

Figure 9:
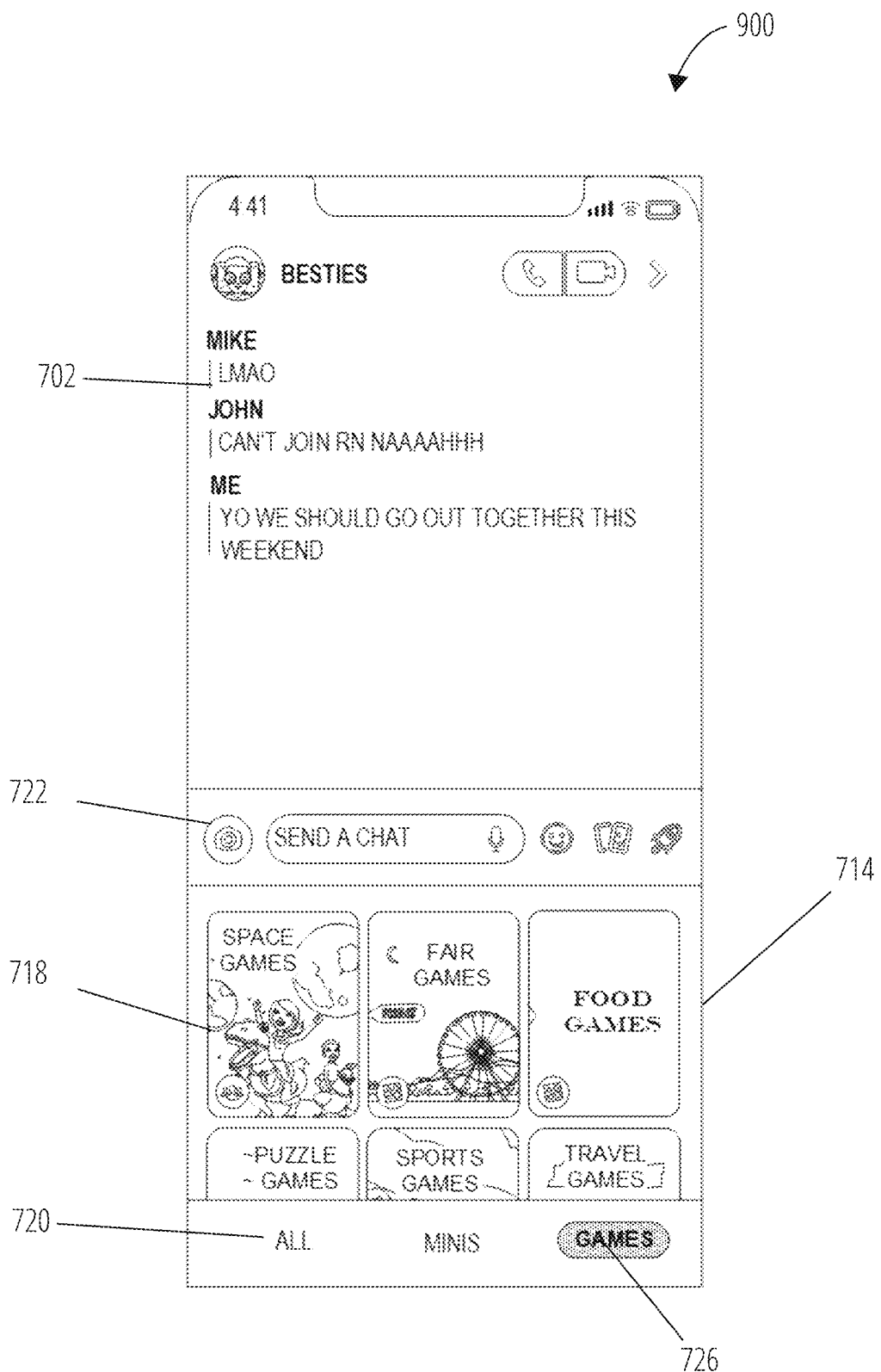
FIG. 9 is an interface diagram illustrating a user interface of the application interface expanded from the chat interface displaying gaining content applications, in accordance with some examples.

9 illustrates an example of a user interface of the media application interface expanded from the chat interface 702 displaying gaming content applications in accordance with some examples. As illustrated in FIG. 9, the media application interface 714 is extended from the chat interface toolbar 722 and chat interface 702. The user has selected the "GAMES" indicia (e.g., a game selector 726) from the selection mechanism 720, resulting in each gaming application 718 being displayed and arranged in the media application interface 714.

The "GAMES" indicium is associated with the gaming applications 718 that are associated with the user via profile data 308 of the user's computing device (e.g., client device 102) or received from a third-party server, computing device, or memory device. The gaming application 718 includes commercial characteristics such as a title, type, and description of the commercial application. In another example, additional commercial characteristics are also depicted.

As shown in FIG. 9, there are six commercial applications 716, each with a title and application type. The gaming applications 718 are formatted in a tile array based on the computing device operating system preference. The gaming application 718 (as well as the commercial application 716) can also include an image overlay, avatar, or graphical icon depicting the media application. For example, one of the gaming applications 718 includes the title "SPACE GAMES," and the application type is entertainment. Additional gaming applications 718 include "FAIR GAMES," "FOOD GAMES," "PUZZLE GAMES," "SPORTS GAMES," AND "TRAVEL GAMES," Each gaming application 718 can be activated by a launch application indicium, such as an "open" or "launch" button or by applying a user gesture (e.g., finger press or finger swipe) on the gaming application 718. The user can also rank and sort the displayed gaming applications, according to the user's preference, gaming application characteristics, or user profile settings.

Figure 10:
FIG. 10 is an interface diagram illustrating a gaming application thumbnail, in accordance with some examples.

FIG. 10 illustrates a graphic thumbnail image 1000 in accordance with some examples. As shown in FIG. 10, the graphic thumbnail image 1000, also referred to as a graphic element, is a reduced sized version of the gaming application 718 depicted in the media application interface 714. In another example, graphic thumbnail image 1000 can also be a reduced sized version of the commercial application 716. In some examples, when a user applies a user gesture on the graphic thumbnail image 1000, the gaming application or commercial application 716 associated with the graphic thumbnail image 1000 is activated. The graphic thumbnail image 1000 appears in the media application interface 714 when its counterpart gaming application 718 has been previously activated by the user.

Figure 11:
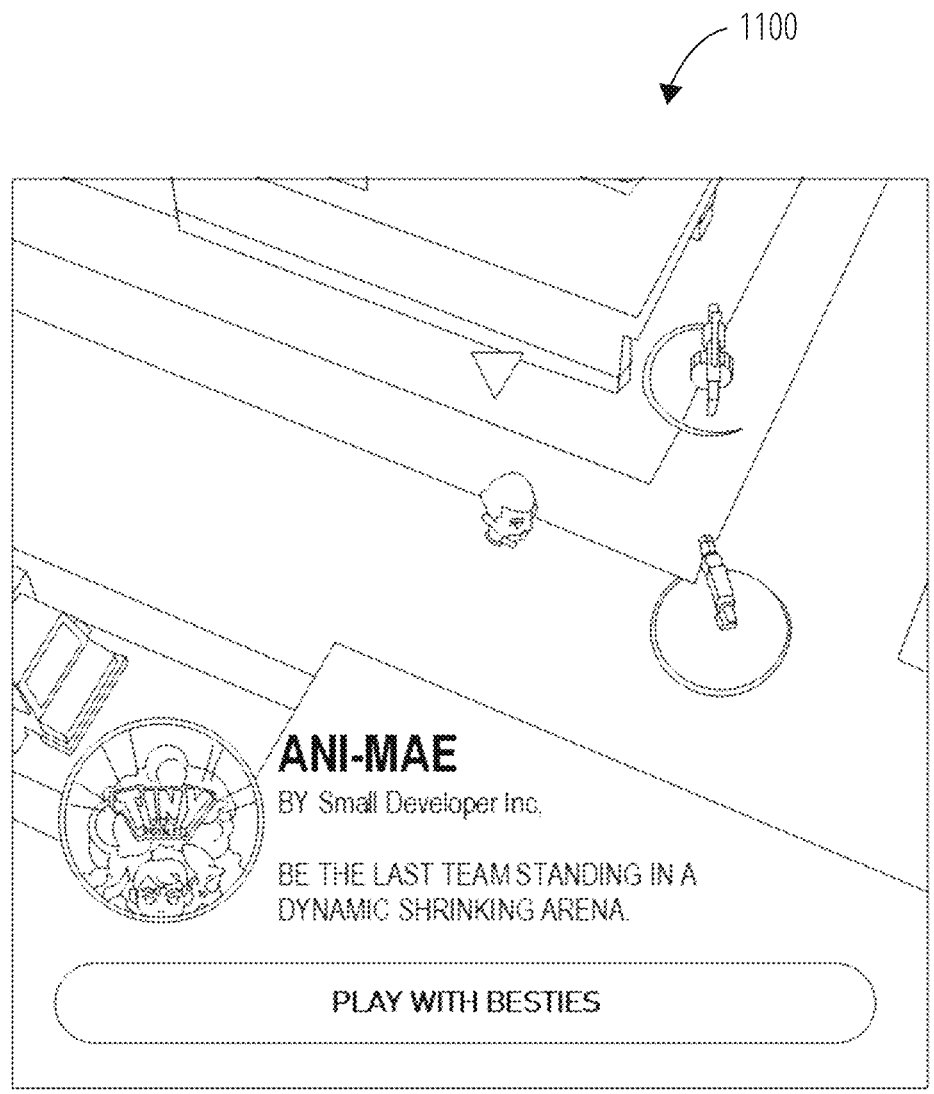
FIG. 11 is an interface diagram illustrating an animated gaming application thumbnail, in accordance with some examples.

FIG. 11 illustrates an animated gaming application thumbnail in accordance with some examples. The animated gaming application thumbnail 1100 is a reduced sized version of the gaming application 718 depicted in the media application interface 714 that includes animated characters, background, objects, and text. The animated gaming application thumbnail 1100 appears in the media application interface 714 when its counterpart gaming application 718 has been previously activated by the user. In some examples, when a user applies a user gesture on the animated gaming application thumbnail 1100, the gaming application associated with the animated gaming application thumbnail 1100 is activated. The animated gaming application thumbnail 1100 can also be a reduced sized animated version of the commercial application 716.

Machine Architecture

Figure 12:
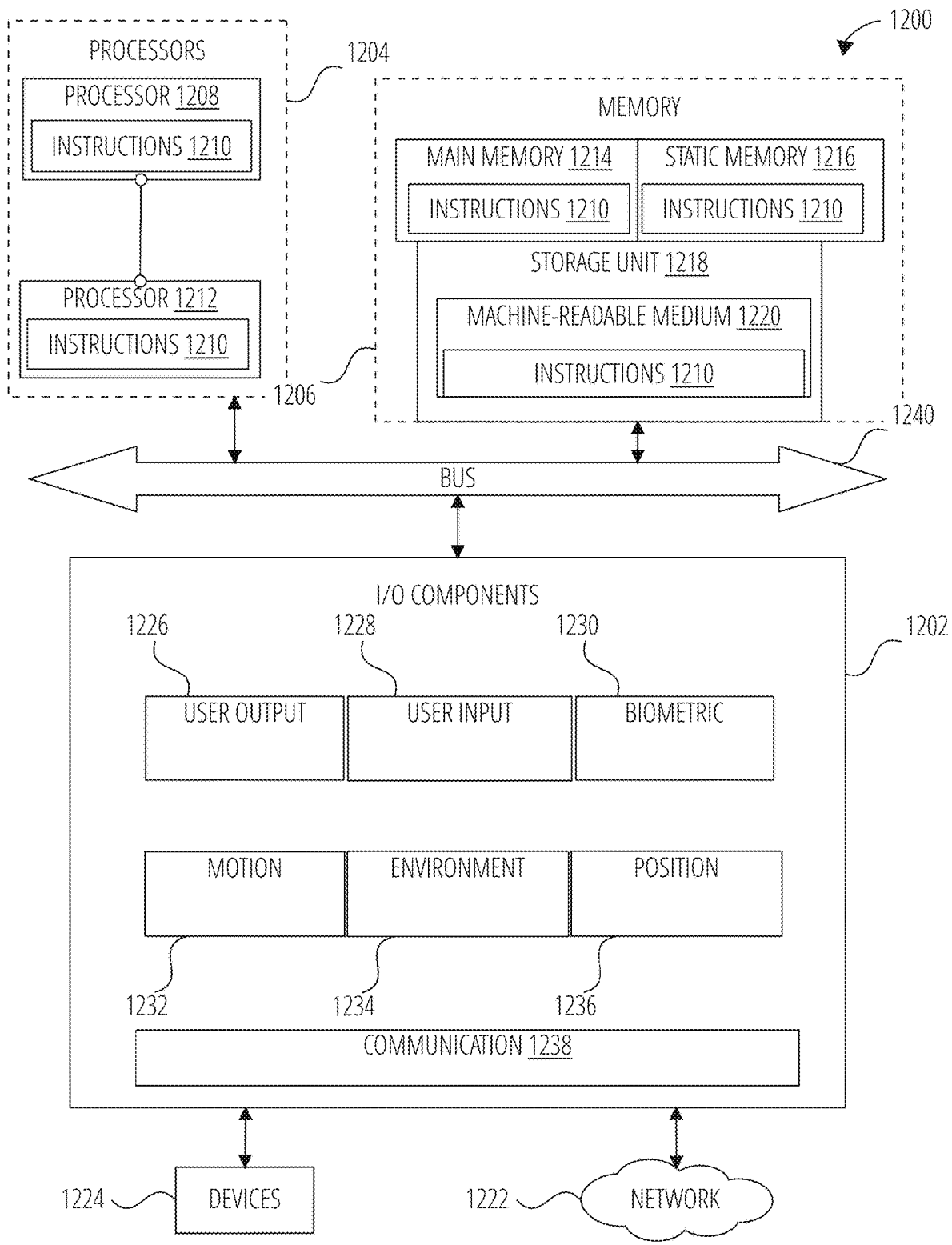
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (SIB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1202, memory 1204, and input/output I/O components 638, which may be configured to communicate with each other via a bus 1240. In an example, the processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RTIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single-core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1240. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the Processor's cache memory), or any suitable combination thereof, during execution thereof by the machine 1200.

The I/O components 1238 may include a wide variety of components to receive input, provide output, produce output, transmit information, exchange information, capture measurements, and so on. The specific I/O components 1238 that are included in a particular machine will depend on the type of machine. For example, portable machines such as mobile phones may include a touch input device or other such input mechanisms, while a headless server machine will likely not include such a touch input device. It will be appreciated that the I/O components 1238 may include many other components that are not shown in FIG. 12. In various examples, the I/O components 1238 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1238 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope).

The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1238 further include communication components 1236 operable to couple the machine 1200 to a network 1220 or devices 1222 via respective coupling or connections. For example, the communication components 1236 may include a network interface Component or another suitable device to interface with the network 1220. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1212, static memory 1214, and memory of the processors 1202) and storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1236) and using any one of several well-known transfer protocols (e.g., hypertext transfer protocol (EITTP)). Similarly, the instructions 1208 may be transmitted or received using a transmission medium via a coupling (e.g., a peer-to-peer coupling) to the devices 1222

Software Architecture

Figure 13:
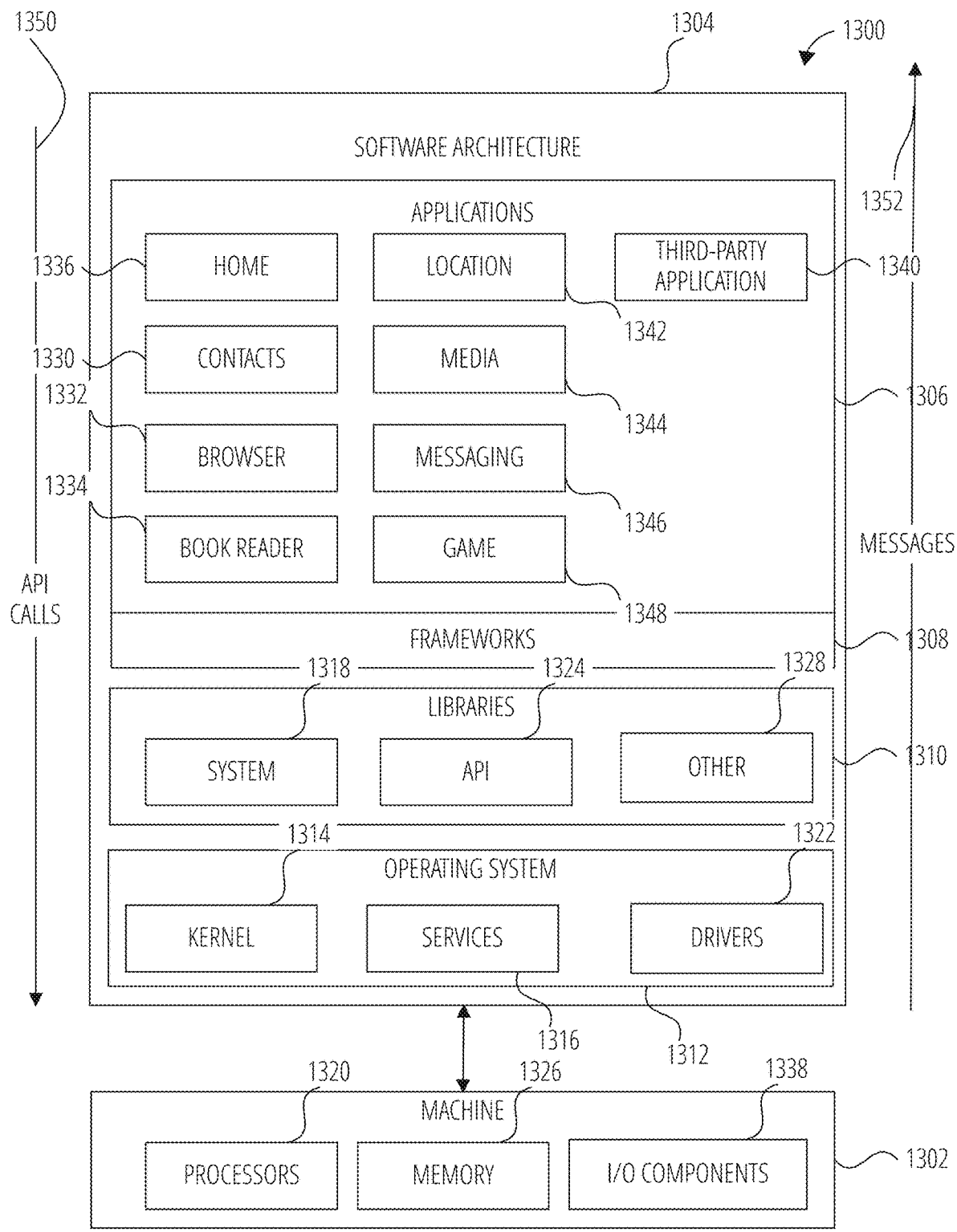
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (11.264 or AVC), Moving Picture Experts Group Layer-3 (MP3), Advanced Audio Coding (AAC), Adaptive Multi-Rate (AMR) audio codec, Joint Photographic Experts Group (JPEG or PG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 1340 can invoke the API calls 1350 provided by the operating system 1312 to facilitate functionality described herein.

Processing Components

Figure 14:
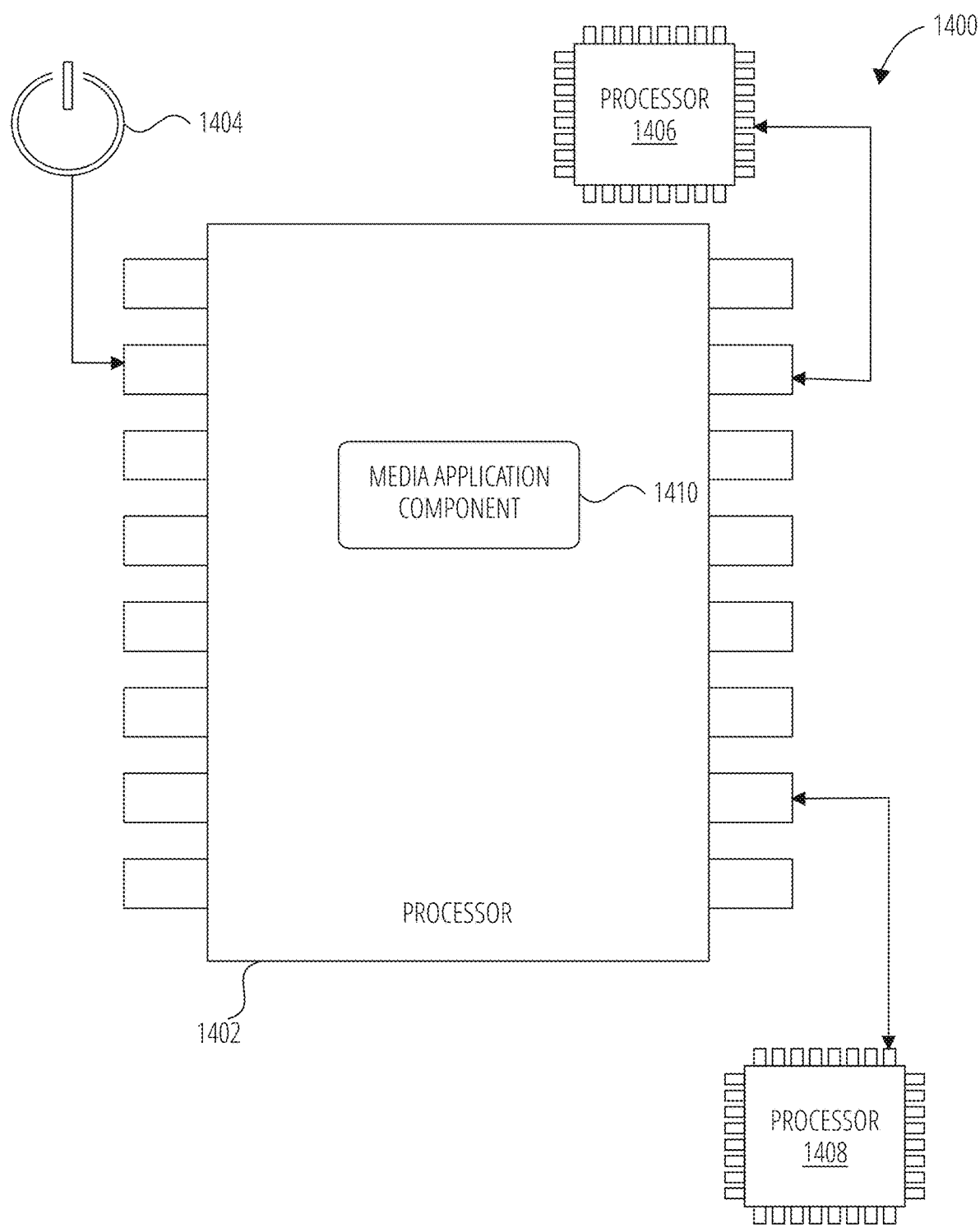
FIG. 14 is a diagrammatic representation of a processing environment, in accordance with some examples.

Turning now to FIG. 14, there is shown a diagrammatic representation of a processing environment 1400, which includes a processor 1402, a processor 1406, and a processor 1408 (e.g., a GPU, CPU or combination thereof).

The processor 1402 is shown to be coupled to a power source 1404, and to include (either permanently configured or temporarily instantiated) modules, namely a media application component 1410. The Media application component 1410 operationally access a first and second category of media applications, receive the first and second category of media applications, generate a media application interface, and cause the media application interface to be displayed. While not shown, the processor 1402 can alternatively include the media application component 1410 that performs the operations of the featured media application system 212. As illustrated, the processor 1402 is communicatively coupled to both the processor 1406 and the processor 1408.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example; at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only, residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media; at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method comprising:
    detecting user selection, in a chat interface displayed at a display device of a computing device, of an application icon, the chat interface including a chat interface display session that displays a chat session between a plurality of users and the user selection being detected based on signals received from a touch screen of the computing device;
    retrieving, using one or more processors, a first category of applications and a second category of applications in response to the detecting of the user selection of the application icon;
    generating a media application interface within the chat interface, the media application interface being displayed concurrently with the chat interface display session, the media application interface being an extended interface that is expanded from a top, side, or bottom portion of the chat interface, and the media application interface concurrently displaying a selection mechanism and at least one of the first category of applications or the second category of applications, the selection mechanism comprising a game selector, a commercial selector, and a collective selector, and wherein first applications included in the first category of applications correspond to one or more gaming application characteristics and second applications included in the second category of applications correspond to one or more commercial application characteristics that are different from the one or more gaming application characteristics;
    detecting user selection of the game selector;
    responsive to the detecting user selection of the game selector, causing the media application interface to display the first category of applications;
    detecting user selection of the commercial selector;
    responsive to the detecting user selection of the commercial selector, causing the media application interface to display the second category of applications;
    detecting user selection of the collective selector; and responsive to the detecting user selection of the collective selector, causing the media application interface to display the first category of applications and the second category of applications.

2. The method of claim 1, comprising:
determining one or more gaming applications to include in the first category of applications based on the one or more gaming application characteristics; and
determining one or more commercial applications to include in the second category of applications based on the one or more commercial application characteristics.

3. The method of claim 1, wherein the second category of applications displayed in the media application interface comprises commercial applications associated with business, productivity, file sharing, social, entertainment, music, health, or education.

4. The method of claim 1, wherein the displaying of the first category of applications in the media application interface comprises displaying at least one of a group of data items comprising a game description, a game graphic element, a gaming characteristic, and a game launching indicia, and wherein the second category of applications displayed in the media application interface comprises a commercial description, a commercial characteristic, a commercial graphic element, and a commercial launching indicia.

5. The method of claim 4, further comprising:
comparing the gaming characteristic with the commercial characteristic;
ranking the first and second category of applications based on the comparing of the gaming characteristics and the commercial characteristics; and
causing the media application interface to display the ranked first and second category of applications.

6. The method of claim 4, wherein the gaming characteristic being at least one of a group comprising a game application type, a game title, a game memory value, an amount of user contacts.

7. The method of claim 4, wherein the commercial characteristic is at least one of a group comprising a commercial application type, a commercial title, a popularity score, and commercial application memory value.

8. The method of claim 4, wherein the game graphic element is a reduced size version of an original version of the game graphic element, the reduced size version of the game graphic element being displayed responsive to a game application corresponding to the game graphic element having been previously activated.

9. The method of claim 1, wherein:
causing the media application interface to display the first category of applications includes modifying the media application interface to display the first category of applications concurrently with the chat interface display session; and
causing the media application interface to display the second category of applications includes modifying the media application interface to display the second category of applications concurrently with the chat interface display session.

10. The method of claim 1, further comprising:
receiving a first user profile, the first user profile comprising an avatar and a contact list;
retrieving, using the one or more processors, a third category of applications and a fourth category of applications based on the first user profile, the third category of applications is associated with the game selector, and the fourth category of applications is associated with the commercial selector; and
responsive to the third and fourth categories of applications, causing the media application interface to display the third and fourth categories of applications.

11. A system comprising:
a display device;
a processor; and
a memory storing instructions that, when executed by the processor, configure the system to perform operations comprising:
detecting user selection, in a chat interface displayed at the display device, of an application icon, the chat interface including a chat interface display session that displays a chat session between a plurality of users and the user selection being detected based on signals received from a touch screen of the display device;
retrieving a first category of applications and a second category of applications in response to the detecting the user selection of the application icon;
generating a media application interface within the chat interface, the media application interface being displayed concurrently with the chat interface display session, the media application interface being an extended interface that is expanded from a top, side, or bottom portion of the chat interface, and the media application interface concurrently displaying a selection mechanism and at least one of the first category of applications or the second category of applications, the selection mechanism comprising a game selector, a commercial selector, and a collective selector, and wherein first applications included in the first category of applications correspond to one or more gaming application characteristics and second applications included in the second category of applications correspond to one or more commercial application characteristics that are different from the one or more gaming application characteristics;
detecting user selection of the game selector;
responsive to the detecting user selection of the game selector, causing the media application interface to display the first category of applications;
detecting user selection of the commercial selector;
responsive to the detecting user selection of the commercial selector, causing the media application interface to display the second category of applications;
detecting user selection of the collective selector; and
responsive to the detecting user selection of the collective selector, causing the media application interface to display the first category of applications and the second category of applications.

12. The system of claim 11, wherein the first category of applications displayed in the media application interface comprises collaborative gaming applications and non-collaborative gaming applications.

13. The system of claim 11, wherein the second category of applications displayed in the media application interface comprises commercial applications associated with custom gaming, business, productivity, file sharing, social, entertainment, music, health, or education.

14. The system of claim 11, wherein the first category of applications displayed in the media application interface comprises a game description, a game graphic element, a gaming characteristic, and a game launching indicia, and wherein the second category of applications displayed in the application interface comprises a commercial description, a commercial characteristic, a commercial graphic element, and a commercial launching indicia.

15. The system of claim 14, further comprising:
comparing the gaming characteristic with the commercial characteristic;
ranking the first and second category of applications based on the comparing of the gaming characteristics and the commercial characteristics; and
causing the media application interface to display the ranked first and second category of applications.

16. The system of claim 14, wherein the gaming characteristic being at least one of a group comprising a game application type, a game title, a game memory value, an amount of user contacts.

17. The system of claim 14, wherein the commercial characteristic being at least one of a group comprising a commercial application type, a commercial title, a popularity score, and commercial application memory value.

18. The system of claim 14, wherein the game graphic element comprises at least one of animated characters, background, objects, or text.

19. A non-transitory computer-readable storage medium, the computer-readable storage medium including instructions that when executed by a computer, cause the computer to perform operations comprising:
detecting user selection, in a chat interface displayed at a display device of a computing device, of an application icon, the chat interface including a chat interface display session that displays a chat session between a plurality of users and the user selection being detected based on signals received from a touch screen of the computing device;
retrieving a first category of applications and a second category of applications in response to the detecting the user selection of the application icon;
generating a media application interface within the chat interface, the media application interface being displayed concurrently with the chat interface display session, the media application interface being an extended interface that is expanded from a top, side, or bottom portion of the chat interface, and the media application interface concurrently displaying a selection mechanism and at least one of the first category of applications or the second category of applications, the selection mechanism comprising a game selector, a commercial selector, and a collective selector, and wherein first applications included in the first category of applications correspond to one or more gaming application characteristics and second applications included in the second category of applications correspond to one or more commercial application characteristics that are different from the one or more gaming application characteristics;
detecting user selection of the game selector;
responsive to the detecting user selection of the game selector, causing the media application interface to display the first category of applications;
detecting user selection of the commercial selector;
responsive to the detecting user selection of the commercial selector, causing the media application interface to display the second category of applications;
detecting user selection of the collective selector; and
responsive to the detecting user selection of the collective selector, causing the media application interface to display the first category of applications and the second category of applications.

20. The non-transitory computer-readable storage medium of claim 19, wherein the first category of applications displayed in the media application interface comprises a game description, a game graphic element, a gaming characteristic, and a game launching indicia, and wherein the second category of applications displayed in the media application interface comprises a commercial description, a commercial characteristic, a commercial graphic element, and a commercial launching indicia.

* * * * *